United States Patent
Anderson et al.

(10) Patent No.: US 9,377,925 B2
(45) Date of Patent: Jun. 28, 2016

(54) GUI WINDOW WITH PORTAL REGION FOR INTERACTING WITH HIDDEN INTERFACE ELEMENTS

(71) Applicant: Citrix Systems, Inc., Fort Lauderdale, FL (US)

(72) Inventors: Matthew Anderson, New York, NY (US); Brian Green, Santa Barbara, CA (US); Albert Alexandrov, Goleta, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 267 days.

(21) Appl. No.: 14/014,792

(22) Filed: Aug. 30, 2013

(65) Prior Publication Data

US 2015/0067542 A1 Mar. 5, 2015

(51) Int. Cl.
| | |
|---|---|
| *G06F 3/0481* | (2013.01) |
| *G06F 3/0484* | (2013.01) |
| *G06F 3/0489* | (2013.01) |
| *H04N 7/15* | (2006.01) |
| *G06F 3/14* | (2006.01) |
| *G06F 9/44* | (2006.01) |

(52) U.S. Cl.
CPC ............ *G06F 3/0481* (2013.01); *G06F 3/0489* (2013.01); *G06F 3/04845* (2013.01); *G06F 3/14* (2013.01); *G06F 3/1454* (2013.01); *G06F 9/4443* (2013.01); *H04N 7/15* (2013.01); *G06F 2203/04803* (2013.01); *G06F 2203/04804* (2013.01)

(58) Field of Classification Search
CPC ...................................................... G06F 3/0481
USPC ........................................................... 715/744
See application file for complete search history.

(56) References Cited

U.S. PATENT DOCUMENTS

| | | | | |
|---|---|---|---|---|
| 5,608,872 A | * | 3/1997 | Schwartz | H04L 12/1813 345/502 |
| 5,694,544 A | * | 12/1997 | Tanigawa | G06F 3/0481 370/260 |
| 5,758,110 A | * | 5/1998 | Boss | G06F 3/0481 715/204 |
| 5,841,435 A | * | 11/1998 | Dauerer | G06F 3/0481 715/764 |
| 6,587,128 B2 | * | 7/2003 | Kanevsky | G09G 5/14 715/768 |

(Continued)

OTHER PUBLICATIONS

Working screenshot of MS Lync 2010 manufactured by Microsoft, Released on 2010, 22 pages.*

(Continued)

*Primary Examiner* — Reza Nabi
(74) *Attorney, Agent, or Firm* — BainwoodHuang

(57) ABSTRACT

A computer is operated by displaying a window on a display device, where the window is an opaque window overlaid on the entirety of a system desktop that includes graphical representations of system controls and application controls. The window displays user interface elements of an application program executing on the computer, and also includes a portal region displaying an image of the system desktop including counterparts of the system controls and application controls. The computer provides user-controlled operation of the system controls and application controls based on simulated user interaction with the counterparts of the system controls and application controls in the portal region. The application program can effectively coordinate the use of the display by itself and by the system and other applications using the system desktop, relieving the user of this task.

20 Claims, 4 Drawing Sheets

(56) References Cited

U.S. PATENT DOCUMENTS

| | | | | |
|---|---|---|---|---|
| 7,035,899 | B2* | 4/2006 | Marchon | H04L 29/06027 348/E7.083 |
| 7,127,745 | B1* | 10/2006 | Herse | G06F 21/6209 726/15 |
| 2004/0024819 | A1* | 2/2004 | Sasaki | H04L 12/1813 709/205 |
| 2004/0024890 | A1* | 2/2004 | Baek | H04L 63/10 709/229 |
| 2004/0179036 | A1* | 9/2004 | Teplov | G06F 3/1454 715/751 |
| 2005/0091608 | A1* | 4/2005 | Gusmorino | G06F 3/0481 715/801 |
| 2005/0132299 | A1* | 6/2005 | Jones | G06F 3/0481 715/759 |
| 2005/0183023 | A1* | 8/2005 | Maruyama | A47B 21/00 715/759 |
| 2006/0002315 | A1* | 1/2006 | Theurer | G06F 3/0481 370/261 |
| 2006/0026502 | A1* | 2/2006 | Dutta | G06Q 10/10 715/230 |
| 2006/0031779 | A1* | 2/2006 | Theurer | G06F 3/1454 715/781 |
| 2006/0107229 | A1* | 5/2006 | Matthews | G06F 3/0481 715/782 |
| 2007/0011356 | A1* | 1/2007 | Schauser | H04L 12/1881 709/248 |
| 2007/0276910 | A1* | 11/2007 | Deboy | G06Q 10/10 709/204 |
| 2008/0270899 | A1* | 10/2008 | Duncan | G06F 1/1616 715/700 |
| 2008/0307001 | A1* | 12/2008 | Cisler | G06F 17/30126 |
| 2008/0307504 | A1* | 12/2008 | Cisler | H04L 63/0823 726/4 |
| 2009/0070670 | A1* | 3/2009 | Kishi | G06F 3/04886 715/702 |
| 2009/0300510 | A1* | 12/2009 | Gantman | G06F 3/0481 715/740 |
| 2010/0262267 | A1* | 10/2010 | Alexandrov | H04M 3/567 700/94 |
| 2011/0019810 | A1* | 1/2011 | Alexandrov | H04L 12/1827 379/204.01 |
| 2011/0241985 | A1* | 10/2011 | Hill | G06F 3/017 345/157 |
| 2012/0133727 | A1* | 5/2012 | Bolduc | H04N 7/152 348/14.07 |
| 2012/0304077 | A1* | 11/2012 | Hornback, Jr. | G06F 3/1454 715/753 |
| 2013/0055113 | A1* | 2/2013 | Chazin | H04L 12/1822 715/758 |
| 2013/0132485 | A1* | 5/2013 | Thomas | H04L 12/1822 709/205 |
| 2013/0290863 | A1* | 10/2013 | Chen | G06Q 10/10 715/747 |
| 2013/0290887 | A1* | 10/2013 | Sun | G06F 3/0482 715/769 |
| 2013/0297696 | A1* | 11/2013 | Alexandrov | H04L 65/403 709/204 |
| 2014/0006974 | A1* | 1/2014 | Bell | H04L 65/403 715/753 |
| 2015/0058753 | A1* | 2/2015 | Anderson | G06F 3/04812 715/753 |
| 2015/0058796 | A1* | 2/2015 | Thakur | G06F 3/04883 715/800 |
| 2015/0200979 | A1* | 7/2015 | Huang | G06F 3/0483 715/753 |

OTHER PUBLICATIONS

Working screenshot of MS Lync 2010 manufactured by Microsoft, Released on 2010, 24 pages.*

Anonymous, "Lync Desktop Sharing UI Issue", Oct. 5, 2011, XP055153946, URL: http://ucken.blogspot.de/2011/10/desktop-sharing-ui-issue.htm, pp. 1-4.

Anonymous, "Application Sharing by Tixeo", Jul. 23, 2006, XP055154075, URL: http://web.archive.org/web/20130726134402/http://www.tixeo.com/en/features/Application-Sharing.htm, pp. 1-2.

Anonymous, "Collaborative Text Editor by Tixeo", Jul. 23, 2006, XP055154076, URL: http://web.archive.org/web/20130726114346/http://www.tixeo.com/en/features/Text-Editor.htm, pp. 1-2.

Anonymous: "Using Adobe Connect 8", Jun. 1, 2013, XP055154348, URL: http://web.archive.org/web/20130601210503/http://help.adobe.com/en_US/connect/8.0/using/connect_8_help.pdf, pp. 1-219.

* cited by examiner

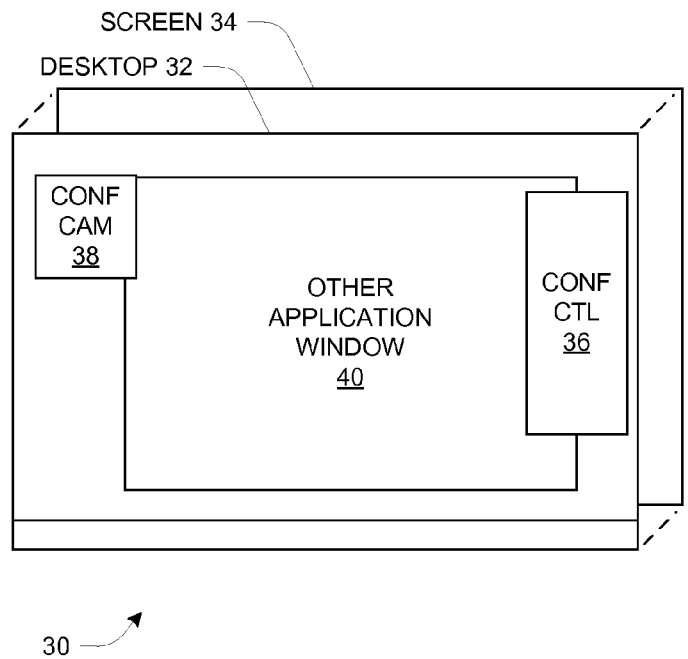
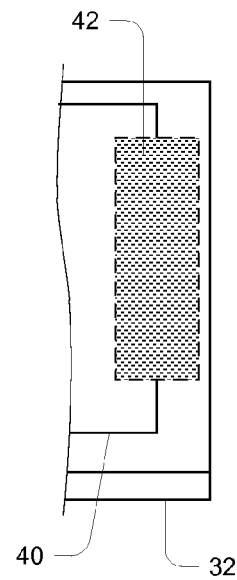
Fig. 3     Fig. 4
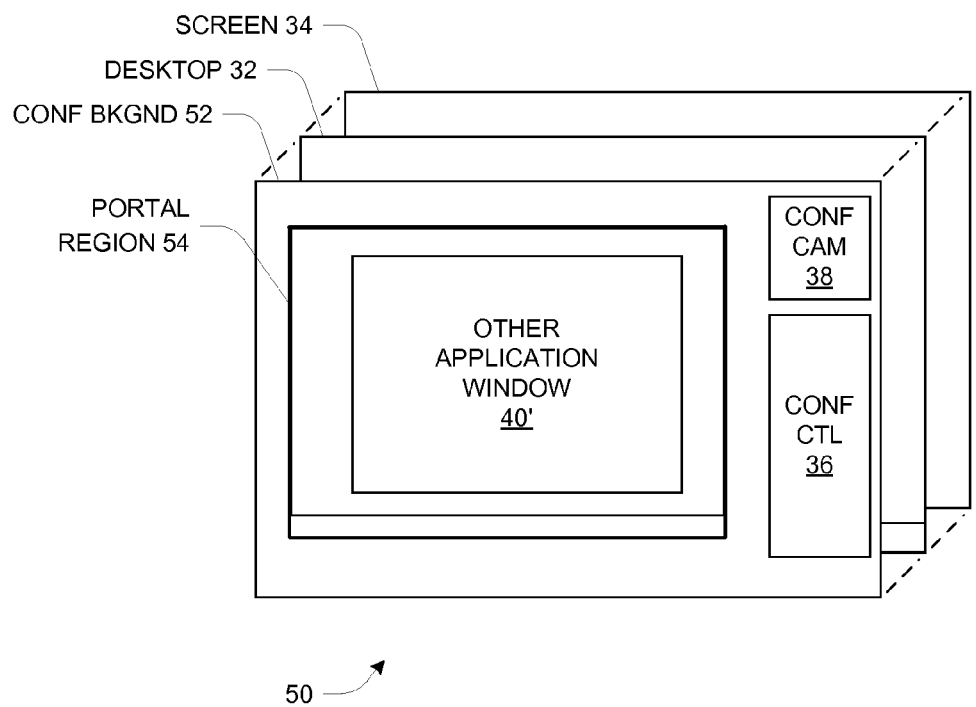
Fig. 5

GUI WINDOW WITH PORTAL REGION FOR INTERACTING WITH HIDDEN INTERFACE ELEMENTS

BACKGROUND

The invention is related to the field of graphical user interfaces in computers. In one particular application, the invention is related to the field of graphical user interfaces in applications such as online conferencing in which a presenter shares an application window or local desktop with other conference participants.

Today, in online meetings, a user interface for a presenter in an online conference can be confusing and awkward. The awkwardness and confusion is particularly noticeable in a common use case—when the presenter is sharing their full desktop. The fundamental problem is that the presenter user interface for the conferencing application resides on the same desktop that is being shared with the other participants. Consider the example where the presenter is showing a full-screen spreadsheet presentation. No matter where the presenter positions windows for incoming webcam views, for example, important parts of the presentation become visually blocked on the presenter's display. Options for the presenter include hiding the webcam windows behind the shared window, or perhaps moving the webcam windows to a second monitor if one is in use. The rest of the conference user interface, such as a control window, is also positioned over the spreadsheet window, so it is awkward for the presenter to interact with the user interface while presenting. As a result it becomes a stressful experience when interaction with the user interface is needed for conference control purposes, such as muting attendees, monitoring chat messages, etc.

Another significant problem found in current online meeting interface models is that there is strong division between the presenter who is sharing his or her screen and the other participants who are receiving that screen-sharing broadcast. The interface for presenters needs to balance showing incoming webcam views, controls, and other interface elements against the desktop that is being shared. The non-presenter interface needs to show incoming webcam views, controls, and the incoming desktop view shared by the presenter. Currently, switching roles from non-presenter to presenter may create user confusion, because the interface may automatically change to maximize visual space so that the local desktop can be seen.

SUMMARY

The above-discussed issues of awkwardness in a user interface, in connection with a conferencing application or other application, arise in part because of demands for use of display area by relatively independent functions. In the above example, the demands are from the conferencing application displaying webcams and control windows, on the one hand, and the spreadsheet application displaying a spreadsheet window. It is up to the user to coordinate the use of the single display by the applications.

The present disclosure is directed to improving a user's experience by rendering the user's desktop within a region of a window of another application, allowing controls and other visual content of the application to easily be located outside of the rendered desktop. From a user's point of view, the disclosed technique solves the problem of having controls and incoming content block part of the desktop. It can also solve the problem of having significantly different interface modes for different users, such as those for a presenter and non-presenter as discussed above. In the disclosed technique, the user's desktop is treated as content being displayed within the application, and a transition into a presenter mode to share the desktop for example would not require changing the interface's layout.

Generally, a disclosed method of operating a computer includes displaying a special window on a display device of the computer, the special window being opaque and being overlaid on a system desktop that includes desktop objects (icons, windows etc.) for user interaction with the computer. The special window displays user interface elements of an application program executing on the computer. In one embodiment the application program is a video conferencing program supporting desktop sharing, i.e., the ability for conference participants to see a presenter's desktop and other application windows on it. In a portal region of the special window, an image of the system desktop is displayed that includes counterparts of the desktop objects.

The disclosed method may be used in a display-only manner in which the portal region is used only to display the image of the system desktop and its desktop object. In a more general use, the method also enables a user to interact with the portal region in a simulated manner that provides for user activation/control of the desktop objects behind the special window as well as visual feedback of that activation and control. By this technique, the application program can effectively coordinate its own use of the display with the use of the display by the system and other applications using the system desktop, aiding the user with this task.

In a more particular aspect, the disclosed technique places the opaque special window over the entire desktop, with this window serving as a background for the application (such as a video conferencing application). The contents of the desktop behind this background window are captured and displayed as a reduced-size image of the desktop within the portal region of the window. A presenter can interact with the reduced-size desktop view with keyboard and mouse as usual—keyboard and mouse events are passed through the special window to the desktop and/or other application windows behind it In one disclosed technique, a simulated pointer is used in the portal region and the system pointer is manipulated in a certain way to effect desired operation. In other technique, the system pointer alone is used, and input events such as mouse movements and button presses in the portal region are captured and used to synthesize corresponding events that are provided to the desktop and desktop objects. In either cases, distinct pointer appearances may be used inside and outside the portal to provide a visual indication when the user is interacting with the desktop rather than the application program.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIGS. 3-9 are schematic diagrams of user interface display elements.

DETAILED DESCRIPTION

Figure 1:
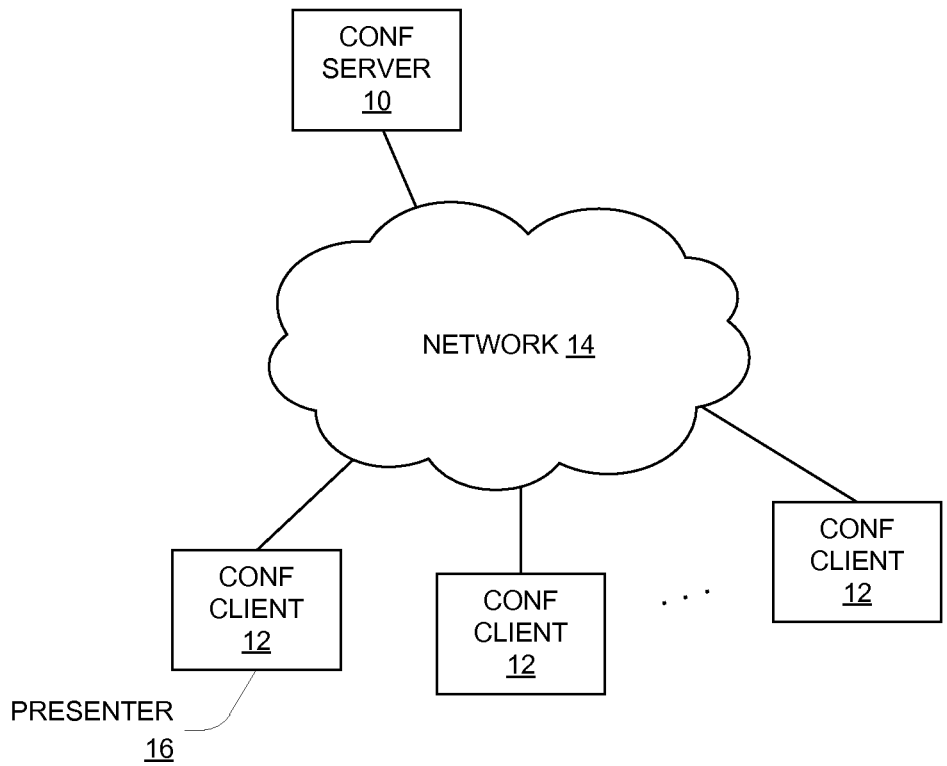
FIG. 1 is a block diagram of a distributed computer system described in connection with a video conferencing application.

FIG. 1 shows an example computer system in the form of a video conferencing system including a conference server 10 and a plurality of conference clients 12 interconnected by a network 14. The conference server 10 and conference clients 12 are typically computerized devices executing specialized conferencing application software and in some cases including specialized hardware as well. The conference server 10 may be a server computer such as a "blade" computer in a data center, while the client computers 12 are more typically personal devices such as personal computers, laptop computers, tablet computers or smartphones for example. The network 14 may be generally any type of data communications network that provides for transmission of conference data among the participants, including for example the Internet.

The system of FIG. 1 may be referred to as a "client-server" arrangement. Those skilled in the art will appreciate that the disclosed techniques may be applied to other arrangements, including so-called "peer-to-peer" arrangements and even to single-computer applications. Also, the presently disclosed techniques are more generally applicable beyond video conferencing.

In operation, the conference clients 12 establish connections and conference sessions with the conference server 10. Each conference client 12 executes a client conference application that provides a graphical user interface to a local conference participant or "attendee", as well as providing for transmission of local audio and video input to the conference server 10 and receiving conference audio and video streams or feeds from the conference server 10 for rendering to the local attendee. The conference server 10 performs merging or "mixing" of the audio and video streams from the conference clients 12 to create the conference feeds provided back to the conference clients 12. Audio is typically mixed into a single output channel distributed to all conference clients 12, enabling all participants to hear any participant who is speaking. Video streams such as from local cameras (web cams) are individually copied to all participants, enabling each participant to see all the other participants. The system also enables documents or other application data to be shared among the conference clients, where the source of a shared item is referred to as a "presenter" 16. For such sharing, the contents of a desktop, window or similar user-interface element are sent from the presenter 16 to the conference server 10, where they are replicated and provided to the other conference clients 12 for local display.

Figure 2:
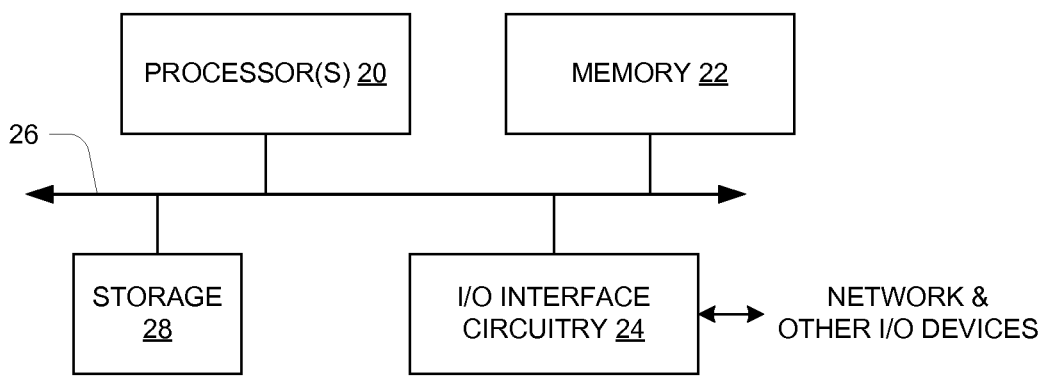
FIG. 2 is a block diagram of a computer from a hardware perspective.

FIG. 2 shows an example configuration of a physical computer such as a conference server 10 or conference client 12 from a computer hardware perspective. The hardware includes one or more processors 20, memory 22, and interface circuitry 24 interconnected by data interconnections 26 such as one or more high-speed data buses. The interface circuitry 24 provides a hardware connection to the network 14 (FIG. 1) and other external devices/connections (EXT DEVs) such as a video display, audio circuitry, and camera. The processor(s) 20 with connected memory 22 may also be referred to as "processing circuitry" herein. There may also be local storage 28 such as a local-attached disk drive or Flash drive. In operation, the memory 22 stores data and instructions of system software (e.g., operating system) and one or more application programs which are executed by the processor(s) 20 to cause the hardware to function in a software-defined manner. Software may be provided as computer program instructions stored on a non-transitory computer-readable medium such as a magnetic or optical disk, Flash memory, etc. Thus the computer hardware executing instructions of a conference application, such as described herein, can be referred to as a conference circuit or conference component, and it will be understood that a collection of such circuits or components can all be realized and interact with each other as one or more sets of computer processing hardware executing different computer programs as generally known in the art.

FIG. 3 depicts a graphical display 30 of a conference client as generally known in the art. A desktop 32 (also referred to as a "system desktop" herein) is a special display object displayed on an otherwise blank display screen 34 by a desktop operating system, such as the Windows® operating system for example. As generally known, the desktop 32 serves as a launching point for applications and provides certain kinds of system interactions as well (e.g., the "system tray" in Windows). In operation the desktop 32 can be partially or even completely covered by other windows that are interaction points for applications and system-provided functions. In the illustrated example, windows of a conferencing application including a conference control (CNF CTL) window 36 and a camera viewing window (CONF CAM) 38 are displayed. Also displayed is an "other" application window 40 for a separate application executing on the conference client, such as a word processor or spreadsheet application.

In FIG. 3 the conference windows 36, 38 cover parts of the desktop 32 as well as parts of the other application window 40. This is illustrated in FIG. 4, where an covered area 42 of window 40 is shown by shading. Any covered parts are not immediately viewable or selectable by the user. This may present difficulties especially for the presenter when sharing his/her desktop with the other participants in a conference. The presenter needs to simultaneously view the conference windows 36, 38 and interact with the desktop 32 and other application window 40, and it may become necessary to move items around to reveal any covered items so that they can be viewed and/or selected. For example, imagine that the presenter needs to select an icon on the desktop 32 to open a document, and that the icon is located in an area covered by the camera viewing window 38. The presenter must first move or minimize the window 38 in order to access the icon. This need for juggling items on the screen can interfere with smooth and efficient operation of a conference. It will be appreciated that this problem can either be avoided or reduced when the presenter has two display screens and can choose to share the contents of one of them while placing the conference windows 36, 38 on the other, non-shared screen. However, the problem occurs especially when a presenter has a single display screen entirely covered by the desktop 32, because the conferencing application places its windows 36, 38 on the same desktop 32 that is being shared by the presenter 16 with other participants 12.

In the remaining description the term "desktop objects" is used to refer to displayed GUI objects residing on the desktop 32 that a user may interact with. These can include icons, windows, tool bars, ribbons, and other objects as generally known in the art. With respect to FIGS. 3 and 4, the other application window 40 is an example of a desktop object.

FIG. 5 shows a graphical display 50 of a conference client 16 according to an embodiment of the present invention. In this case, the conferencing application is itself involved in displaying desktop objects and other items to the user, and it uses this capability to better arrange the user display to avoid the problem discussed above. In particular, the conference application displays a special window referred to in one embodiment as a conference background window (CONF BKGND) 52 that completely and opaquely covers the desktop 32. The conference application uses the background window 52 as a background for displaying the conference windows 36, 38. The background window 52 preferably has a "background" nature from a visual perspective. For example, it may have a plain and uniform color and texture across the entire window 52. Generally its design is such that it is not misinterpreted by the user as the desktop 32 or as another conference window having important content. Its main job is to hide the desktop 32 and the desktop objects.

The conference background window 52 includes a portal region 54 that is used to display representations of desktop items that are hidden by the conference background window 52. In one embodiment, the portal region 54 contains an image that is a scaled-down version of the entire desktop 32 and all items on it except for the conference windows 36, 38, 52. This arrangement is useful when a presenter "shares" his/her desktop 32 (i.e., makes it visible to other participants) as part of the conference. In the illustrated example, the image in the portal region 54 includes an image of an application window 40' that is a scaled version of the other application window 40 of FIG. 3. Essentially, the desktop 32 and desktop objects (such as other application window 40) are represented in the portal region 54 as separate content of the conferencing application, while the real desktop 32 and desktop objects are hidden behind the conference background 52. A presenter 16 can interact with an image of the desktop 32 that is free of any covering by the separate conference windows 36, 38, improving usability and smooth operation. In one embodiment, the portal region 54 may be a separate window with normal window functions including the ability to be moved, resized, minimized etc. In other embodiments it may be desirable to use some other construct, and the portal region may be relatively fixed in size and location.

Figure 6:
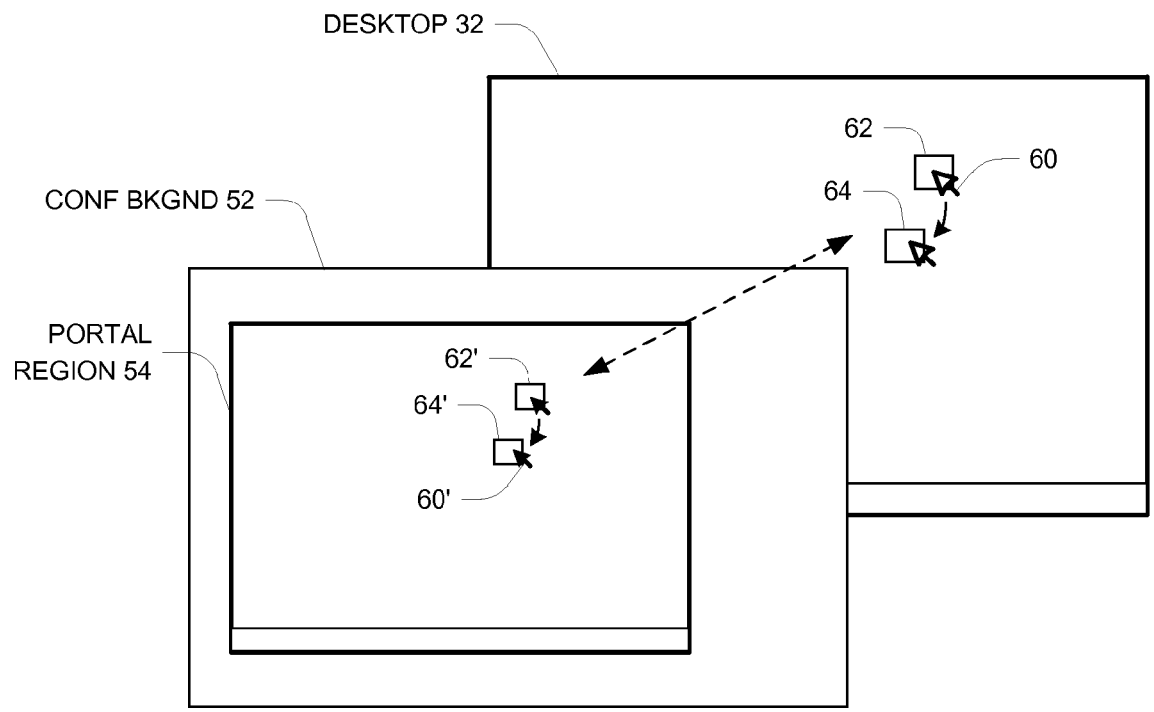
Figure 7:
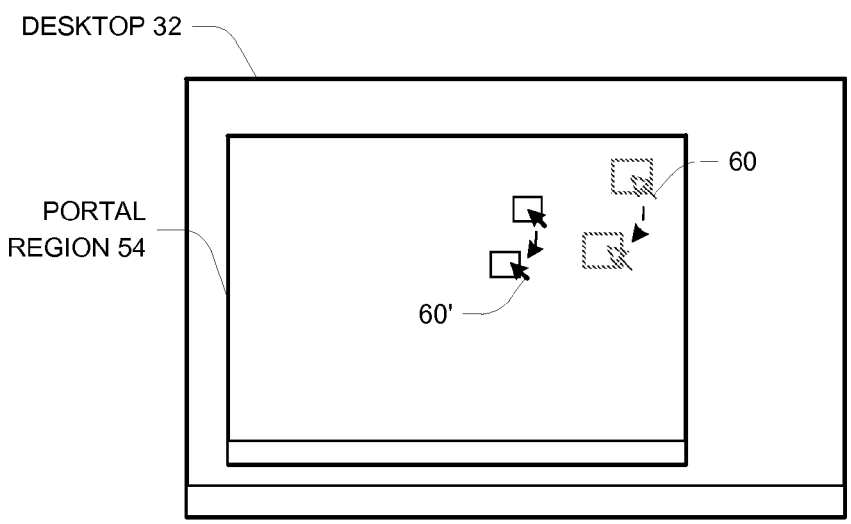

FIG. 6 illustrates one aspect of operation of the arrangement of FIG. 5. In this simplified example, a user is moving a system pointer 60 (under control of a mouse, for example) from one location to another, specifically from one icon 62 to another icon 64. However, the user doesn't see the desktop 32, but rather sees a scaled version of it in the portal region 54. The scaled desktop displays corresponding scaled icons 62' and 64', as well as a simulated pointer 60'. As input events such as mouse movements, mouse button presses, and key presses occur, they are applied at the point of the system pointer 60, and the portal region 54 and simulated pointer 60' are used to mimic the activity on the (hidden) desktop 32 to provide visual feedback to the user. In the example of FIG. 6, movement of the (invisible) system pointer 60 causes corresponding scaled movement of the simulated pointer 60' in the portal region 54, providing visual feedback of the mouse movement. FIG. 7 is another depiction of the situation of FIG. 6. The conference background window 52 is omitted for clarity, and the portal region 54 is shown directly on top of the desktop 32 as it would be in operation (as opposed to the schematic offset depiction of FIG. 6). The system pointer 60 is shown in phantom, representing that it is not actually visible to the user, and its position on the desktop 32 corresponds to the position of the simulated pointer 60' in the portal region 54 (which is user-visible).

Figure 8:
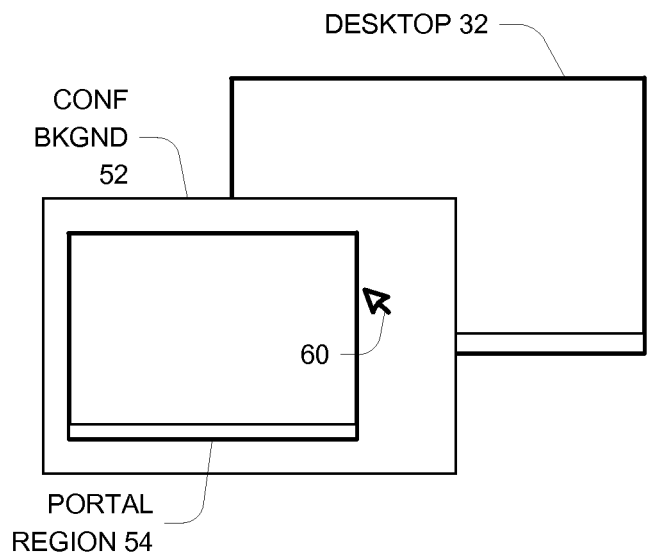
Figure 9:
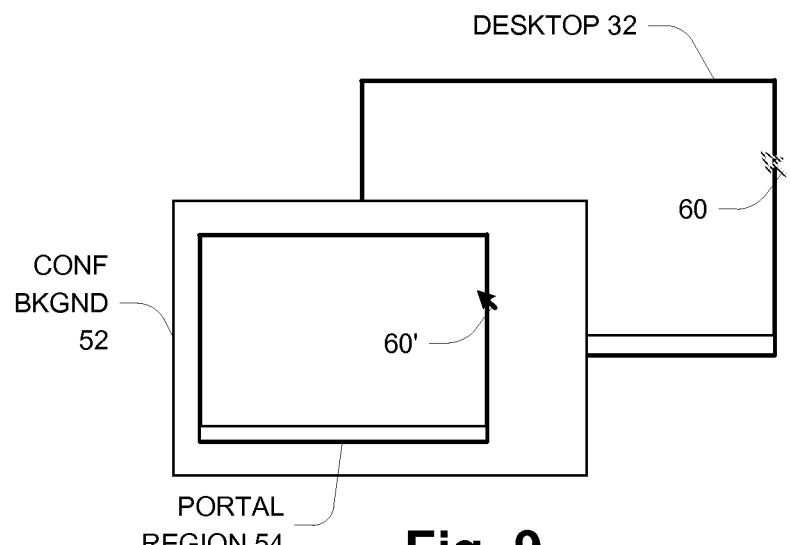

FIGS. 8 and 9 illustrate two distinct modes of operation and the transitions between these operating modes.

FIG. 8 shows a first operating mode. The system pointer 60 is located outside the portal region 54. The system pointer 60 is visible to the user and its movements are determined directly by input from the system pointing device (e.g., mouse) in the usual manner. The conference background 52 and its windows 36, 38 (omitted from FIG. 8 for clarity) are treated as normal application windows with respect to their interaction with the system pointer 60, and they receive input events such as mouse button presses, keyboard input, etc. in the normal manner. The simulated pointer 60' is not active or visible. It may or may not actually be present on the display, but if present it is rendered as completely transparent and it has no effect on operation.

FIG. 9 shows a second operating mode. The simulated pointer 60' is both visible and active within the portal region 54. The system pointer 60 is present and active but not visible. The conference background 52 and its windows 36, 38 do not interact with the system pointer 60 in the usual manner—this is explained more below. Input events are interpreted based on the location of the system pointer 60 with respect to the desktop 52 and any desktop objects thereon, as though the conference background 52 and its windows 36, 38 were not present. In a sense, the system pointer 60 is operated "behind" the conference background 52 and its windows 36, 38. FIG. 9 shows the system pointer 60 at the far right edge of the desktop 32, but in this operating mode it may be located anywhere (including directly behind the portal region 54).

The system transitions between the two operating modes based on user movement of the mouse or other pointing device/mechanism. When the system is in the first operating mode (FIG. 8), it transitions into the second operating mode (FIG. 9) as the mouse movement causes the system pointer 60 to encounter a boundary of the portal region 54. The location of this encounter is referred to as the "point of entry". When the boundary is encountered, the simulated pointer 60' is visibly rendered at the point of entry, and the system pointer 60 is at the same time rendered invisible and moved to the corresponding scaled location on the desktop 32. That location will generally be adjacent to an edge of the desktop 32 corresponding to the edge of the portal region 54 that was encountered, such as shown in FIG. 9. Once this transition has been made, operation in the second operating mode commences, with the system pointer 60 being free to move anywhere on the desktop 32 and the simulated pointer 60' tracking its movements as described above.

The reverse transition occurs when the system pointer 60 is moved off the desktop 32, i.e., there is a mouse movement causing the system pointer 60 to encounter a boundary of the desktop 32. The simulated pointer 60' is then removed or rendered invisible, and the system pointer 60 is at the same time rendered visible and moved to a corresponding location on the conference background window 42. That location will generally be near an edge of the portal region 54, such as shown in FIG. 8. Once this transition has been made, operation in the first operating mode commences, with the system pointer 60 now being constrained to movement outside the portal region 54.

In the second operating mode, the system pointer 60 is hidden from the user by replacing the shape with a completely transparent one. Also, the conference background 52 and its windows 36, 38 are configured to operate in a pass-through manner such that input events (keyboard and mouse) go through them and are passed to the desktop 32 and desktop objects behind them. In a Windows® system, such operation can be obtained by use of an extended window style setting WS_EX_TRANSPARENT, as is known in the art. This window style setting for the conference background 52 and its windows 36, 38 is toggled as operation transitions between the first and second modes. In other types of systems, other system-specific mechanisms may be used.

In the above description it is assumed that the boundary of the portal region 54 corresponds exactly to the boundary of the desktop 32, this being a practical configuration that may be useful in many embodiments. In alternative embodiments, the portal region 54 may show only a portion of the desktop 32, and in such configurations the transitions between operating modes occur with respect to the boundary of that portion of the desktop 32 rather than with respect to the boundary of the whole desktop 32 as described above. In one particular use, the portion of the desktop 32 may be that portion displayed on one display monitor of a two-monitor display arrangement in which the entirety of the desktop 32 actually extends across both monitors.

In alternative embodiments another type of mechanism may be used to handle input events and provide visual feedback to a user when interacting with the portal region 54. For example, rather than using a simulated pointer 60' and relocating the system pointer 60 as described above, in one alternative no simulated pointer is used—the system pointer 60 is always visible and freely locatable anywhere across the display. Operation depends on its location. When the system pointer 60 is outside the portal region 54, operation is as described above for the first operating mode, i.e., input events are passed to the conferencing windows 36, 38 (or other foreground windows) in the usual manner. When the system pointer 60 is inside the portal region 54, then a mechanism is employed for translating actual input events to corresponding synthesized events that are provided to the desktop 32 and its desktop objects. For example with reference to FIG. 6, a button press at the location of icon 62' in the portal region 54 is translated to a synthesized button press at the location of icon 62 on the desktop 32. The appearance of the system pointer 60 might also be changed when inside the portal region 54 to provide a visual indication of the different operating mode.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a computer using a plurality of modes associated with pointer operation, comprising:
    displaying a special window on a display device of the computer, the special window being opaque and being overlaid on a system desktop that includes desktop objects for user interaction with the computer, the desktop objects being in an occluded region behind and occluded by the special window, the special window displaying user interface elements of an application program executing on the computer; and
    in a portal region of the special window, displaying an image of the system desktop including a counterpart of the occluded region and the desktop objects therein,
    wherein the desktop objects include user-activated desktop objects providing visual feedback of user activation of the desktop objects in the form of corresponding simulated user interaction with the counterparts of the desktop objects in the portal region,
    and wherein the plurality of modes comprises a first operating mode and a second operating mode, wherein in the first operating mode a system pointer is active in the special window outside the portal region, and wherein in the second operating mode a pass-through property is applied to the special window so that input events are passed through the special window to the desktop objects in the occluded region of the system desktop.

2. A method according to claim 1, wherein the special window is a first window, the user-activated desktop objects include a second window having a counterpart window image in the portal region, the user interaction includes window operations performed on the second window, and the visual feedback includes corresponding simulated window operations on the window image.

3. A method according to claim 2, wherein the user interaction includes user data entry by an input device, the user data entry resulting in entry of user data into the second window.

4. A method according to claim 3, wherein the input device is a keyboard.

5. A method according to claim 1, wherein the simulated user interaction includes manipulation of a portal-region pointer for indicating simulated action points for selection and/or data entry, the portal-region pointer being a simulated pointer whose position is mapped from a position of a system pointer establishing actual action points on the system desktop.

6. A method according to claim 5, wherein in the second operating mode the simulated user interaction occurs and the system pointer is hidden on the display device, and wherein:
    a first transition from the first operating mode to the second operating mode occurs when the system pointer encounters a boundary of the portal region and includes (1) making the simulated pointer visible and active beginning at an entry point in the portal region, and (2) making the system pointer invisible and moving it to a location on the system desktop corresponding to the entry point; and
    a second transition from the second operating mode to the first operating mode occurs when the system pointer encounters a boundary at an exit point of the system desktop and includes (1) making the simulated pointer invisible and inactive, and (2) making the system pointer visible and moving it to a location on the special window at the boundary of the portal region corresponding to the exit point.

7. A method according to claim 6, wherein invisibility of the system pointer and/or simulated pointer is accomplished by applying a property of transparency to the respective pointer.

8. A method according to claim 6, wherein the simulated pointer has a similar appearance as the system pointer except for size scaling between the portal region and the system desktop.

9. A method according to claim 1, wherein in the second operating mode the simulated user interaction occurs and actual input events are translated to corresponding synthesized events that are provided to the system desktop and its desktop objects.

10. A method according to claim 1, wherein the desktop objects are part of an arrangement of desktop content of the system desktop, and wherein the image of the system desktop includes a scaled-down version of the arrangement of desktop content.

11. A method according to claim 1, wherein the application program shares the system desktop with a user of another computer by providing the image of the system desktop to the other computer for display.

12. A method according to claim 11, wherein the application program is a video conferencing program, the special window is a conference background window, and the user interface elements include a conference control window, the conference control window providing controls to enable a local user to control operation of a video conference session.

13. A method according to claim 1, wherein the application program is a video conferencing program providing a graphical user interface to a presenter in a desktop-sharing video conferencing system, the video conferencing program sharing the system desktop with a user of another computer by providing the image of the system desktop to the other computer for display, and wherein the desktop objects are user-activated desktop objects included in an arrangement of desktop content of the system desktop, and wherein the special window is a conference background window and the user interface elements are displayed in a set of conference foreground windows, the conference background window occluding the system desktop, the conference foreground windows including a conference control window and a shared desktop window, and the shared desktop window located in the portal region and including a scaled-down version of the arrangement of desktop content, and further comprising:

providing visual feedback of user activation of the desktop objects in the form of corresponding simulated user interaction with the counterparts of the desktop objects in the shared desktop region.

14. A non-transitory computer-readable medium having computer program instructions recorded thereon, the instructions being operative when performed by a computer using a plurality of modes associated with pointer operation to cause the computer to perform a method including:

displaying a special window on a display device of the computer, the special window being opaque and being overlaid on a system desktop that includes desktop objects for user interaction with the computer, the desktop objects being in an occluded region behind and occluded by the special window, the special window displaying user interface elements of an application program executing on the computer; and in a portal region of the special window, displaying an image of the system desktop including a counterpart of the occluded region and the desktop objects therein, wherein the desktop objects include user-activated desktop objects providing visual feedback of user activation of the desktop objects in the form of corresponding simulated user interaction with the counterparts of the desktop objects in the portal region, and wherein the plurality of modes comprises a first operating mode and a second operating mode, wherein in the first operating mode a system pointer is active in the special window outside the portal region, and wherein in the second operating mode a pass-through property is applied to the special window so that input events are passed through the special window to the desktop objects in the occluded region of the system desktop.

15. A non-transitory computer-readable medium according to claim 14, wherein the simulated user interaction includes manipulation of a portal-region pointer for indicating simulated action points for selection and/or data entry, the portal-region pointer being a simulated pointer whose position is mapped from a position of a system pointer establishing actual action points on the system desktop.

16. A non-transitory computer-readable medium according to claim 15, wherein in the second operating mode the simulated user interaction occurs and the system pointer is hidden on the display device, and wherein:

a first transition from the first operating mode to the second operating mode occurs when the system pointer encounters a boundary of the portal region and includes (1) making the simulated pointer visible and active beginning at an entry point in the portal region, and (2) making the system pointer invisible and moving it to a location on the system desktop corresponding to the entry point; and a second transition from the second operating mode to the first operating mode occurs when the system pointer encounters a boundary at an exit point of the system desktop and includes (1) making the simulated pointer invisible and inactive, and (2) making the system pointer visible and moving it to a location on the special window at the boundary of the portal region corresponding to the exit point.

17. A non-transitory computer-readable medium according to claim 14, wherein the application program is a video conferencing program providing a graphical user interface to a presenter in a desktop-sharing video conferencing system, the video conferencing program sharing the system desktop with a user of another computer by providing the image of the system desktop to the other computer for display, and wherein the desktop objects are user-activated desktop objects included in an arrangement of desktop content of the system desktop, and wherein the special window is a conference background window and the user interface elements are displayed in a set of conference foreground windows, the conference background window occluding the system desktop, the conference foreground windows including a conference control window and a shared desktop window, and the shared desktop window located in the portal region and including a scaled-down version of the arrangement of desktop content, and wherein the method further includes:

providing visual feedback of user activation of the desktop objects in the form of corresponding simulated user interaction with the counterparts of the desktop objects in the shared desktop region.

18. A non-transitory computer-readable medium according to claim 14, wherein the special window is a first window, the user-activated desktop objects include a second window having a counterpart window image in the portal region, the user interaction includes window operations performed on the second window, and the visual feedback includes corresponding simulated window operations on the window image.

19. A non-transitory computer-readable medium according to claim 14, wherein the application program shares the system desktop with a user of another computer by providing the image of the system desktop to the other computer for display.

20. A non-transitory computer-readable medium according to claim 19, wherein the application program is a video conferencing program, the special window is a conference background window, and the user interface elements include a conference control window, the conference control window providing controls to enable a local user to control operation of a video conference session.

* * * * *